April 8, 1924.  
J. E. TSAVARIS  
BUOYANCY EQUIPMENT FOR AIRCRAFT  
Filed June 20, 1922  
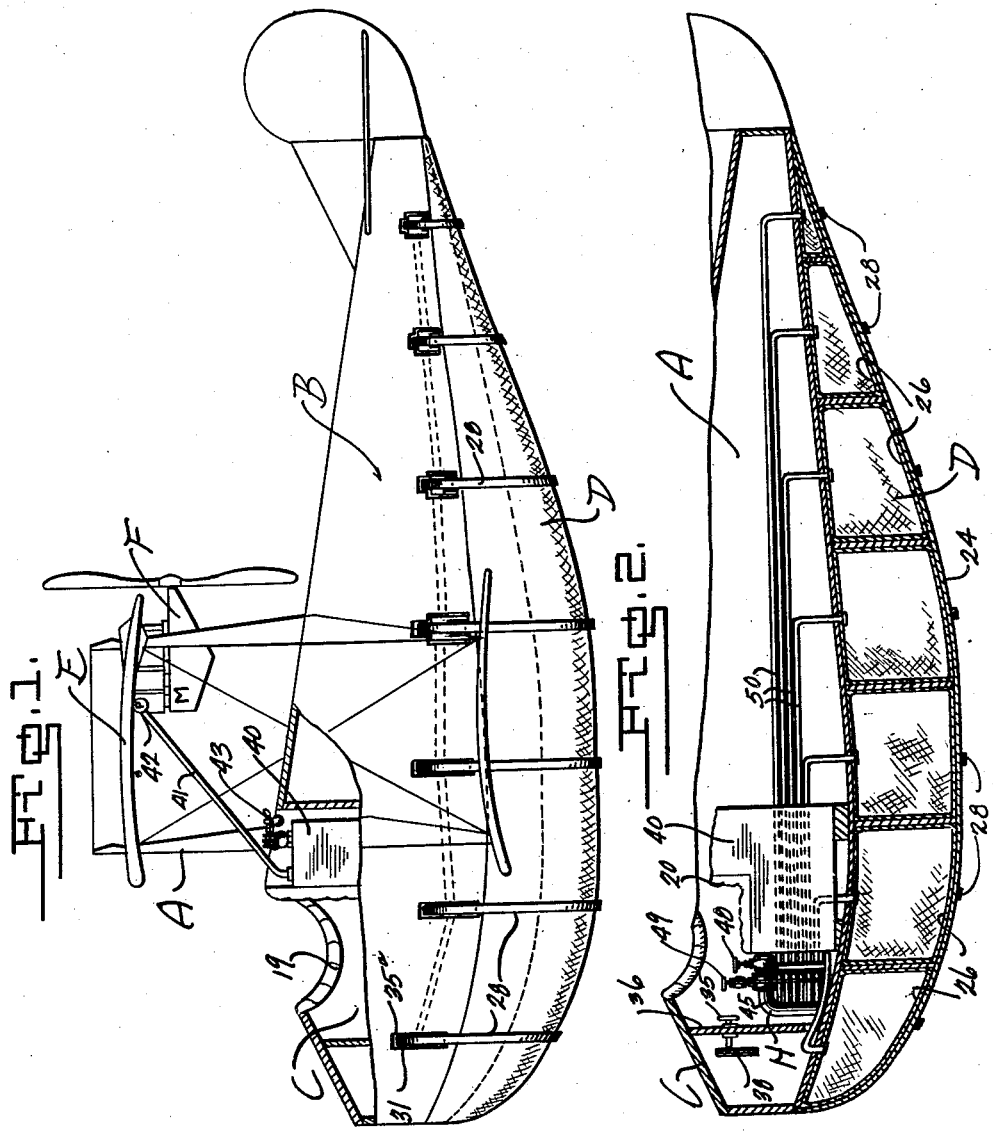
Inventor  
John E. Tsavaris April 8, 1924.
J. E. TSAVARIS
1,489,619
BUOYANCY EQUIPMENT FOR AIRCRAFT
Filed June 20, 1922  3 Sheets-Sheet 2
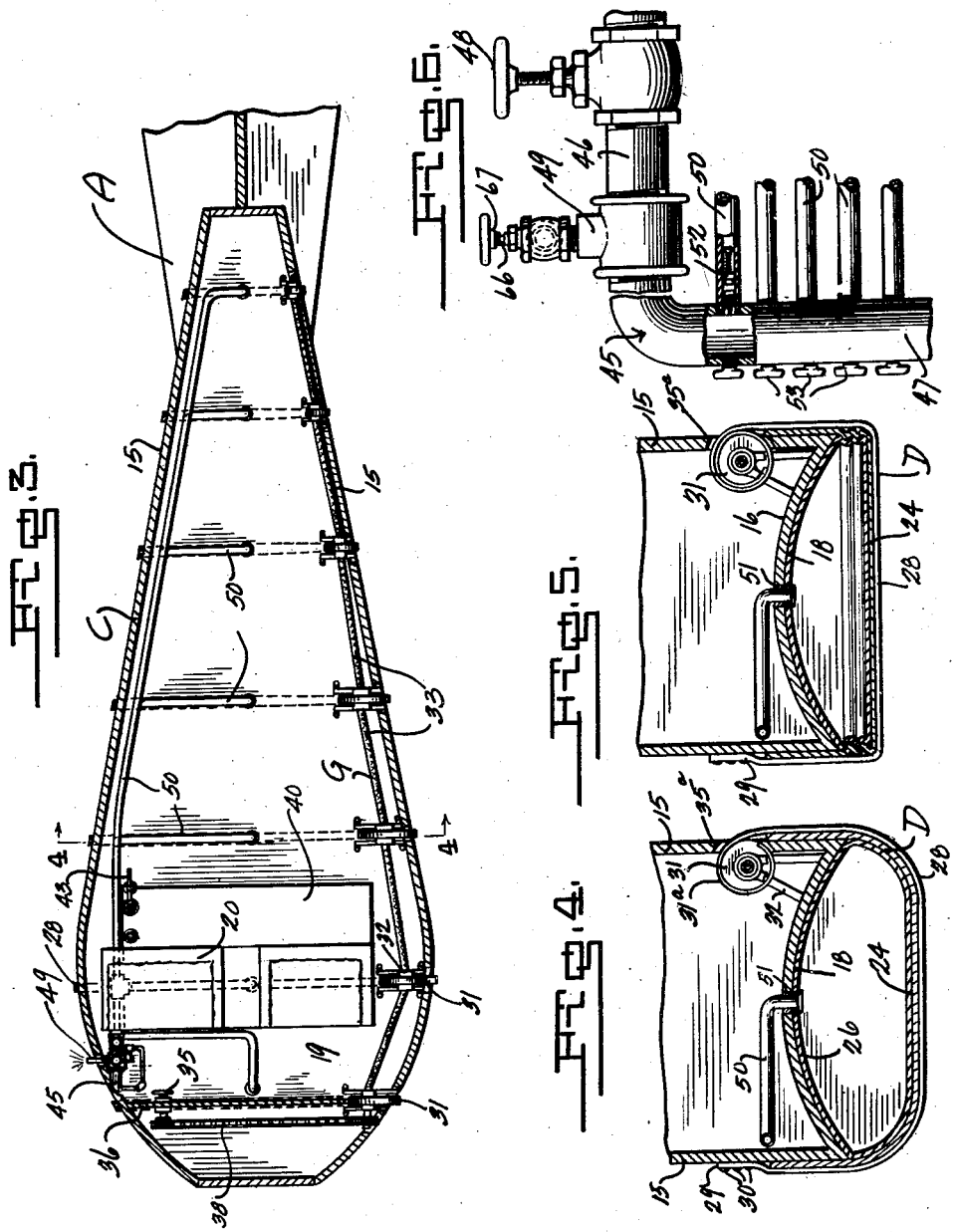
Inventor
John E. Tsavaris April 8, 1924.
J. E. TSAVARIS
1,489,619
BUOYANCY EQUIPMENT FOR AIRCRAFT
Filed June 20, 1922     3 Sheets-Sheet 3
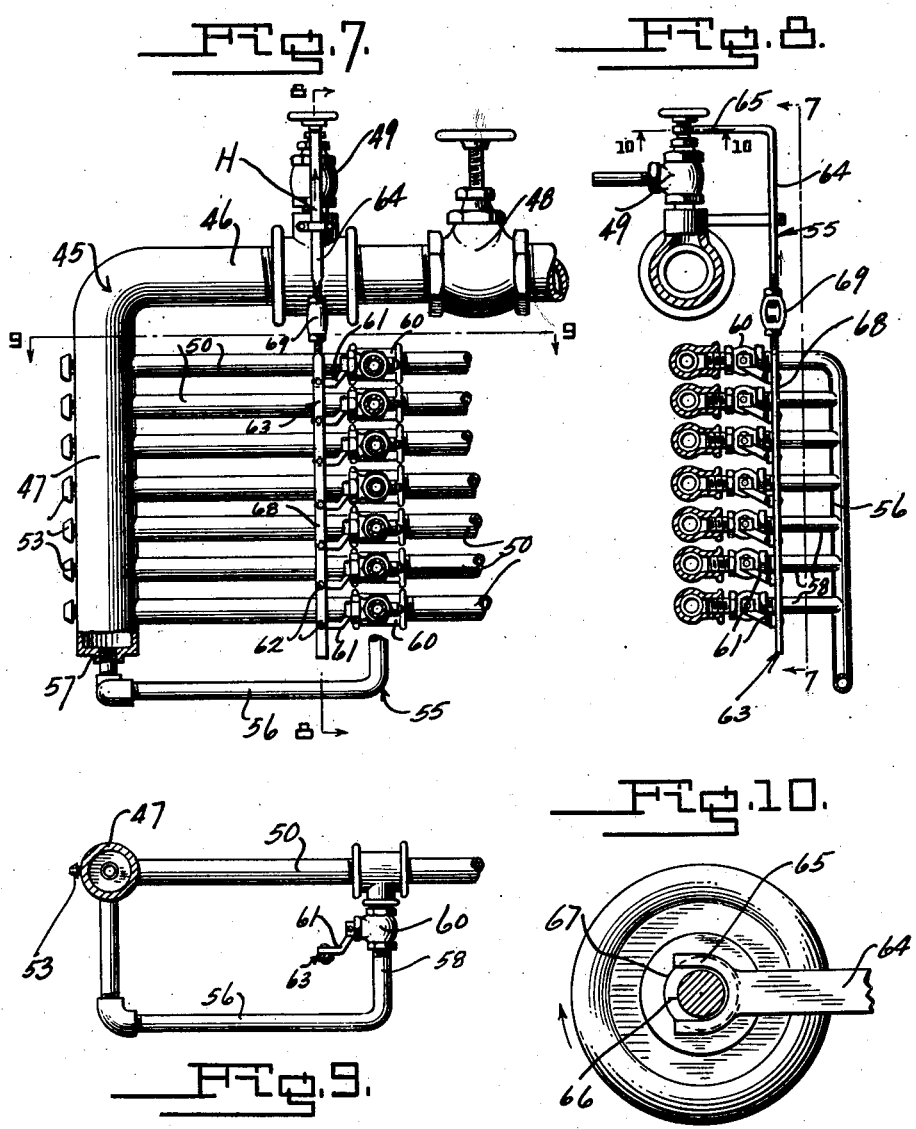
Inventor
John E. Tsavaris

Patented Apr. 8, 1924.

1,489,619

UNITED STATES PATENT OFFICE.

JOHN EMILE TSAVARIS, OF TARPON SPRINGS, FLORIDA.

BUOYANCY EQUIPMENT FOR AIRCRAFT.

Application filed June 20, 1922. Serial No. 569,617.

*To all whom it may concern:*

Be it known that I, JOHN E. TSAVARIS, a citizen of the United States, residing at Tarpon Springs, in the county of Pinellas and State of Florida, have invented certain new and useful Improvements in Buoyancy Equipments for Aircraft, of which the following is a specification.

This invention relates to an improved air craft construction.

The primary object of this invention is the provision of buoyancy equipment for aircraft, such as seaplanes, which may expeditiously be inflated for supporting the aircraft upon a body of water, or collapsed when the aircraft is being propelled through space to reduce the head on resistance.

An important object of this invention is the provision of an aircraft, which embodies an improved fuselage comprising rigid and collapsible sections, which cooperate in the provision of an aircraft of the above mentioned character.

A further object of this invention is the provision of a novel type of apparatus whereby an envelope, used for buoyancy purposes may be readily and instantly collapsed by the operator of the aircraft with but little exertion.

A further object of this invention is the provision of an aircraft of the above mentioned character, which embodies a plurality of inflatable compartments, and having an improved arrangement for regulating the flow of air into the compartment and the release of air therefrom according to the desires of an operator.

A further object of this invention is the provision of an aircraft of the above mentioned character, which is simple in construction, easy of operation and compactly arranged so that the aircraft may be of maximum utility.

Other objects and advantages of this invention will be apparent from the following description:

In the drawings, forming a part of this specification, and wherein similar reference characters designate corresponding parts throughout the several views:

Figure 1 is a side elevation of the improved air craft showing the buoyancy equipment thereof in a relation to support the air craft upon a body of water.

Figure 2 is a fragmentary longitudinal sectional view, through the improved air craft as illustrated in Figure 1.

Figure 3 is a plan view, partly in section, showing details of the improved buoyancy equipment.

Figure 4 is a transverse sectional view, showing details of the improved buoyancy equipment when in extended and inflated condition, taken on the line 4—4 of Figure 3.

Figure 5 is a transverse cross sectional view of the improved buoyancy equipment, showing details similar to those illustrated in Figure 4, however, with the buoyancy equipment deflated and in collapsed position.

Figure 6 is a fragmentary view, partly in section, showing means for controlling the flow of a body of air or gas with respect to the buoyancy equipment.

Figure 7 is a fragmentary side elevation of a conduit arrangement, showing the manner in which air may be regulated for flow into or release with respect to the buoyancy equipment.

Figure 8 is a transverse cross sectional view, taken on the line 8—8 of Figure 7.

Figure 9 is a transverse cross sectional view, taken on the line 9—9 of Figure 7.

Figure 10 is an enlarged cross sectional view, taken substantially on the line 10—10 of Figure 8.

In the drawings, wherein for the purpose of illustration is shown the preferred embodiment of this invention, the letter A designates an aircraft including the body construction B. The body construction B preferably includes the rigid fuselage part C, and the collapsible envelope D. Any approved supporting plane arrangement E is provided, as well as the internal combustion engine and propeller arrangement F. Means G is provided for supporting and regulation of the envelope D, and air inlet and release means H is provided for controlling the inflation and deflation of the envelope D.

The air craft A may, of course, be of any construction, since the principle of this invention may be embodied in the smallest of air craft as well as the largest passenger craft. However, it is preferred that the fuselage C be of rigid construction, including the side walls 15 and bottom wall 16. It is preferred that the bottom wall 16 be of novel construction, and concavo-convex in cross section to provide the recess 18, which extends upwardly into the rigid fuselage C, in order to accommodate the collapsible envelope D, as will be more specifically described hereinafter.

The body construction B is formed to provide a cock pit 19, in which a seat 20 is provided for accommodating the operator or passengers of the aircraft A.

The envelope D is of novel construction and includes a collapsible outer casing 24 of fabric or any approved durable material, which may be appropriately connected at the longitudinal edges thereof to the side walls 15 of the fuselage C, in order to provide a chamber below said fuselage for the reception of tubes or bags 26 of impervious expansible material, such as rubber used in the inner tubes of pneumatic tires. The casing 24, as well as the bags or tubes 26 are relatively formed so that when the said bags 26 are inflated for extending the casing 24, the envelope construction D cooperates with the rigid fuselage C to provide a body construction B of streamline formation. To this end, the forward and rear bags 26 will be of less capacity than the intermediate bags 26. In this manner, the body construction B, is of a conventional formation when the envelope D is inflated, so that the same is of symmetrical design, and conforms in this and other respects to aero dynamic laws by which air crafts are governed.

Referring to the means G for regulating the support of the envelope arrangement D, the same includes a plurality of flexible strips 28, one of each of said strips 28 being provided for a compartment 26, adapted for extending transversely of the envelope D midway of the particular bag 26 with which it cooperates; each of said strips 28 having an end 29 secured to a fuselage wall 15 as by rivets 30. The opposite end 31ª of each strip 28 is wound about a pulley 31, said pulleys 31 being supported by any suitable bearing arrangements 32. The pulleys 31 are connected by means of shafting 33, which may be of the flexible type. It is preferred that the end 31ª of each belt or strip 28 be wound circumferentially about the pulley 31, so that said belt extends through suitable apertures 35ª in a wall 15 of the fuselage. All of the pulleys 31 are arranged along the same wall of the fuselage, and which wall is opposite to that wall on which the ends of the belts or strips 28 are fixed. A hand wheel 35 is preferably provided upon the dash 36 of the body construction B extending into the cock pit 19, whereby an operator may rotate said wheel 35; the same having a sprocket wheel and sprocket chain arrangement 38 connecting the same to the shafting 33, so that all of the pulleys 31 may be simultaneously operated for winding or unwinding of the supporting strips 28. As is illustrated in Figure 4, when the bags 26 are inflated, by means of the arrangement H to be subsequently described, the envelope D will extend downwardly from the fuselage C in taut manner, whereby the aircraft A may be buoyantly supported upon a body of water. However, when the aircraft A is used for flying purposes, the operator, after release of air from the bags 26 may wind the supporting strips or belts 28 upon the pulleys 31 and whereby the envelope construction D will collapse into the recess 18 provided in the bottom wall 16 of the rigid fuselage C, and in consequence of which, the head on resistance of the aircraft A will be materially lessened.

It is preferred that the envelope arrangement D be adapted for receiving air, which is supplied to a compressed air tank 40 through a tube 41 from an air pressure pump 42, which is operated by the internal combustion engine F. The compressed air tank 40 is preferably conveniently disposed within the chamber of the fuselage C, so that it provides a support for the seat 20. In order to prevent possibility of accident, a safety valve arrangement 43 is carried by the tank 40. A main conduit 45 leads from the compressed air tank 40 upon the right side thereof and which is provided with a horizontal portion 46 and a vertical portion 47. The horizontal portion 46 of the main conduit 45 is preferably provided with a cut off valve 48, by means of which the operator may cut off communication between the tank 40 and the envelope bags 26. A main release valve 49 is likewise provided in the horizontal portion 46 of the main conduit 45, and which is provided to release contents of the envelope bags 26, in a manner which will be subsequently described. The downturned or vertical portion 47 of the main conduit 45 is provided with a plurality of branch conduits or pipes 50, which lead therefrom in parallel relation. A branch pipe 50 leads to an individual air bag 26, and is in communication therewith as by a non-leak connection 51. In this manner, communication is established between the main conduit 49 and the individual bags 26 of the envelope arrangement D. In order to prevent liability of return flow of the air or other fluid after the same is once disposed in the bag 26 for inflating the same, it is preferred that check valves 52, of the ordinary pneumatic tire type be disposed within each branch conduit 50 immediately adjacent its connection with the main conduit 45, so that air may readily pass into the branch conduits 50 from the main conduit 45, but be prevented from return into the main conduit 45 past the same. In order that an operator may have access to each check valve 52 for adjusting or other purposes, it is preferred that a plurality of plugs 53 be provided in the main conduit 45, diametrically opposed to the connection of the branch conduit 50 therein, so that an operator by removing a plug 53 may have access to the check valve 52 from the interior of the main conduit 45.

In order that the bags 26 of the envelope arrangement D may be instantly deflated, an improved release arrangement 55 is provided, which cooperates with the release valve 49, to permit exhaustion of the contents of the bags 26. This arrangement 55 includes an auxiliary conduit 56 which communicate, as at 57, with the interior of the main conduit 45, at the bottom of the vertical portion 47. Conduit connections 58 are disposed in parallel relation from each of the branch conduits 50 to communicate with the auxiliary conduit 56, and whereby air may flow from the conduits 50 through the auxiliary conduit 56 back into the main conduit 45 for release purposes. A release valve 60 is disposed in each connection 58, whereby the contents of each branch conduit 50 may be controlled in so far as release of the same into the main conduit 45 is concerned. Each release valve 60 is preferably of the cone type and provided with a crank arm 61, which may be detachably connected, as at 62, to a synchronizing rod 63. The synchronizing rod 63 extends vertically and includes an upper section 64, which is provided with a forked end 65, adapted for working in a groove 66, of the release valve 49, said groove 66 being provided in the stem portion 67 of the valve 49. The upper section 64 of the synchronizing rod 63 is adjustably connected to the lower section 68 as by a turn buckle arrangement 69, said lower section 68 of course, being that section, to which the crank arms 61 are detachably connected at the point 62.

In operation, when the craft A is being propelled through space, the envelope arrangement D will be collapsed in order to lessen head on resistance. When it is the desire of an operator to alight upon a body of water, it is but necessary to open the valve 48 and the air from the tank 40 will flow from the main conduit 45 into the branch conduits 50, and then into the separate compartments 26 of the envelope arrangement D for inflating the same. When the envelope arrangement D is entirely inflated, the same will assume the appearance, as is illustrated in Figure 1 of the drawings, and whereby the craft A may be buoyantly supported upon water. Should it be desired to leave the body of water for flying, the operator need merely release the valve 49 which will automatically open the individual release valves 60, for releasing the contents of the different compartments 26 into the main conduit 45, the cut off valve 48 of course, having been closed. It is then but necessary for the operator to rotate the wheel 35, in order to entirely fold the envelope arrangement D in collapsed relation within the recess 18 of the fuselage C.

Any number of tubes or bags 26 may be provided, consistent with the capacity of the aircraft.

Different accessories may be provided upon the improved buoyancy, such as a power operated means for operating the envelope regulating means G. Likewise, gauges may be provided, whereby an operator may determine the efficiency of the individual compartment. It is contemplated to provide release arrangements for automatic operation by each pulley 31.

Various changes in the shape, size and arrangement of parts and substitution of equivalents may be made to the invention herein shown and described, without departing from the spirit of this invention scope of the claims:

I claim:

1. An aircraft fuselage comprising a body construction including an upper section recessed inwardly from the bottom thereof, an envelope section positioned upon the bottom of said upper section, means for collapsing of the envelope below the recess of said upper section, and means for inflating said envelope to provide a float for said air craft.

2. An aircraft fuselage, comprising an upper rigid fuselage section, a lower envelope section, means for inflating said envelope section for float purposes, means for release of the contents of said envelope, and means for compact collapsing of the envelope upon the upper section.

3. An aircraft, comprising a fuselage having the bottom thereof hollowed concavely, a collapsible air receiving envelope, and means for retaining of said envelope within the bottom of said fuselage, said means including a plurality of extensible belt strips.

4. In an aircraft, the combination of a fuselage including a bottom wall hollowed concavely, a collapsible air receiving envelope, a plurality of belt members attached at one end to said fuselage and extending transversely beneath the envelope, pulley means receiving the opposite ends of said belt members, and means for simultaneously operating said pulleys for winding or unwinding said belt members thereon to permit deflation or inflation of said envelope.

5. In an aircraft, the combination of a fuselage including a hollowed bottom, a flexible casing disposed below said fuselage and attached thereto to provide a chamber therein below said fuselage bottom, a plurality of expansible bags providing separated compartments disposed within the chamber provided by said casing, air inlet and release means for each compartment, and control apparatus for supporting of said casing and envelope in extended or collapsed position, said casing and bags when in collapsed position being held by said means within the hollow of said fuselage.

6. An aircraft comprising a fuselage, a compressed air tank, a collapsible float carried by the fuselage, a conduit communicating the compressed air tank and float, a cut off valve in said conduit, and a release valve in said conduit.

7. An aircraft comprising a fuselage, a collapsible envelope comprising a plurality of compartments, air supply means including a conduit leading to each compartment of the envelope, a check valve in each conduit to prevent intercommunication of the compartments, and means for release of the compartment contents.

8. In an aircraft, the combination of a fuselage including a rigid portion and a flexible envelope portion subdivided into compartments, a compressed air tank, a main conduit leading from said compressed air conduit, branch conduits leading from said main conduit to the envelope compartments, a check valve in said branch conduit to prevent return flow of the compartment contents into the main conduit, and means for release of the compartment contents to permit collapsing of the envelope into the rigid portion of said fuselage.

9. An aircraft, comprising a fuselage, including a rigid section and a flexible envelope section, means providing a plurality of separated compartments within said flexible envelope, a compressed air tank, a main conduit communicating with said compressed air tank, a branch conduit leading from the main conduit to each compartment of the envelope section, check valves for the branch conduits to prevent return flow of the compartment conduits into the main conduit, a release valve in each branch conduit, and adjustable means for simultaneous release of the contents of all of said compartments to enable collapse of the envelope section.

10. An aircraft, comprising a fuselage, including a rigid section and a flexible envelope section, means providing a plurality of separated compartments within said flexible envelope, a compressed air tank, a main conduit communicating with said compressed air tank, a branch conduit leading from the main conduit to each compartment of the envelope section, a check valve for each branch conduit to prevent return flow of the compartment contents into the main conduit, a release valve in each branch conduit, a main release valve in the main conduit, a conduit leading from the release valves of the branch conduits to the main conduit, and means connecting the main release valve and branch release valves for operation to permit simultaneous exhaustion of the contents of the compartments.

11. An aircraft, comprising a fuselage, including a rigid section and a flexible envelope section, means providing a plurality of separated compartments within said flexible envelope, a compressed air tank, a main conduit communicating with said compressed air tank, branch conduits leading from the main conduit to each compartment of the envelope section, a check valve for each branch conduit to prevent return flow of the compartment contents into the main conduit, a release valve in each branch conduit, a main release valve in the main conduit, a conduit leading from the release valves of the branch conduits to the main conduit, means communicating the main release valve and branch release valves for simultaneous exhaustion of the contents of said compartments, and a cut-off valve in said main conduit intermediate the main release valve and the compressed air tank.

12. A release mechanism comprising a main conduit having a main release valve therein, a plurality of conduits communicating with said main conduit upon one side of said release valve, check valves disposed in each of said branch conduits adjacent their juncture with the main conduit, release valves in each of said branch conduits, an auxiliary conduit leading from the release valves of said branch conduits and communicating with said main conduit, crank arms carried by the release valves of said branch conduits, and an adjustable synchronizing rod pivotally connecting the release valves of said branch conduits and pivotally connected to the main release valve, whereby upon opening or closing of said release valve the synchronizing rod may be moved for simultaneous operation of the release valve and said branch conduit release valves.

JOHN EMILE TSAVARIS.